United States Patent Office 3,829,407
Patented Aug. 13, 1974

3,829,407
POLY-N, N-ETHYLENE UREAS AND THERMOSET RESINOUS COMPOSITIONS DERIVED THEREFROM
William J. McKillip and Billy M. Culbertson, Worthington, Ohio, assignors to Ashland Oil Inc., Ashland, Ky.
No Drawing. Continuation-in-part of abandoned application Ser. No. 865,493, Oct. 10, 1969. This application Feb. 22, 1973, Ser. No. 334,634
Int. Cl. C08g 22/06
U.S. Cl. 260—77.5 R        5 Claims

ABSTRACT OF THE DISCLOSURE

Linear addition polymers having pendant N,N-ethylene ureido functionality and the thermoset products derived therefrom by reaction with a crosslinking agent containing a plurality of reactive hydrogen atoms or through condensation of the N,N-ethylene ureido groups in the presence of a Lewis acid catalyst; such products having general utility in surface coating, molding and adhesive applications.

CROSS-REFERENCE TO RELATED APPLICATION

This application is a continuation-in-part of Ser. No. 865,493, filed Oct. 10, 1969, now abandoned.

BACKGROUND OF THE INVENTION

Field of the Invention

This invention relates to reactive thermoplastic polymers having multiple N,N-ethylene ureido functionality and to the substantially infusible and insoluble cross-linked resinous products derived therefrom.

Description of the Prior Art

It has hitherto been proposed to prepare reactive polymers of the type herein concerned by copolymerizing an N-vinyl-N',N'-ethylene urea with a vinyl monomer copolymerizable therewith. This manner of preparing poly-N,N-ethylene ureas and the characterization of a variety of the resultant polymers is set forth in "Makromolekulare Chemie" 78 (1964), pp. 168–177. Apart from the distinction that the polymers obtained in accordance with the present invention are advantageously different in their structural makeup as compared to those exemplified in the aforesaid prior art, the latter also importantly suffers from a processing standpoint in that the monomers affording the indicated residues are ultimately derived from isopropenyl isocyanate.

SUMMARY OF THE INVENTION

In accordance with the present invention, novel poly-N,N-ethylene ureas are provided through the reaction of the pendant isocyanate groups of an aliphatic polyisocyanate with an ethylene imine, said polyisocyanate in turn obtained by thermolyzing an addition polymerization product of a tertiary amine acrylamide or methacrylamide with a vinyl or vinylidene monomer copolymerizable therewith.

In order to facilitate a better understanding of the statement of invention given above, the following generalized graphic illustration of the manner by which the contemplated poly-N,N-ethylene ureas are prepared is set forth below in which R of the vinyl aminimide represents hydrogen or methyl and wherein A⁻ represents a different compound, i.e., one devoid of aminimide functionality, containing a polymerizable CH$_2$=C< grouping. With respect to this process schematic, it is to be noted that the formula given for the resultant polymers is strictly empirical and moreover does not reflect the modicum of other functional residues present, such as pendant urethane and/or aminimide residues.

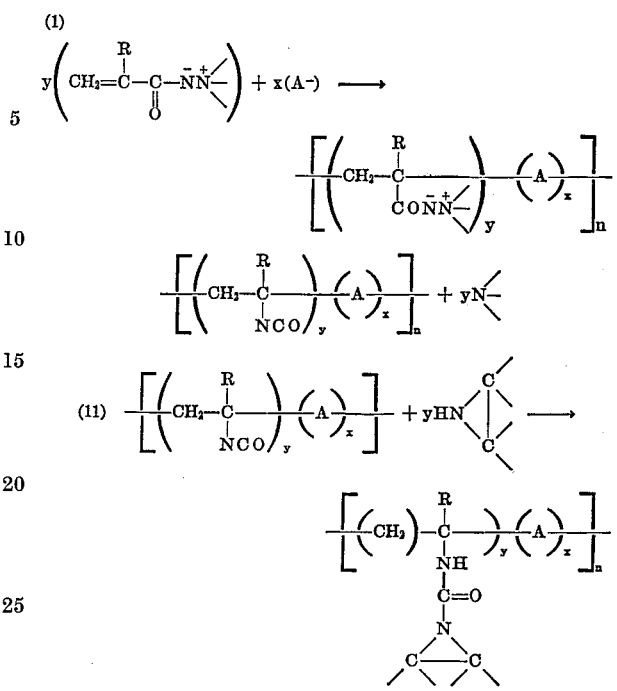

The poly-N,N-ethylene ureas of this invention can be converted to thermoset products by heating in the presence of a suitable ring opening catalyst such as a Lewis acid. A further important aspect of this invention resides in the conversion of the poly-N,N-ethylene ureas to thermoset products by reaction with a crosslinking agent having at least two reactive hydrogen atoms as determined by the Zerewitinoff method.

It is with respect to the aforementioned utilitarian aspects that the contemplated poly-N,N-ethylene ureas represent an improvement over the prior art noted above. Because of the conditions inherent in the manner for deriving these reactive polymers in accordance with the present invention, the derivative thermoplastic polymers will contain a modicum of pendant residues in the form of urethane and/or aminimide groups. These residues accordingly serve to enhance the adhesive and cohesive property of the resultant thermoset product which is of advantage in both adhesive and coating applications.

DESCRIPTION OF THE PREFERRED EMBODIMENTS

As is to be noted from the above summary of the invention, the base starting material for obtaining the novel N,N-polyethylene ureas of this invention is a tertiary amine acrylimide. Particularly exemplary of such compounds are those having the following formula:

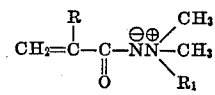

wherein R is hydrogen or methyl, and R$_1$ is methyl or a 2-hydroxy lower alkyl.

Amine acrylimides of the type depicted above can be conveniently prepared by reacting an acrylate, preferably one having a lower alkyl substituent in the ester group, with an unsymmetrical disubstituted hydrazine, e.g., 1,1-dimethyl hydrazine, and a lower alkylene oxide such as, for example, ethylene oxide. In accordance with this method, an applicable variation thereof consists of initially reacting the alkylene oxide with the hydrazine, whereupon the resultant hydroxy aminimine can be reacted with the acrylate in a separate step. Further details relative to the above procedures are set forth in U.S. Pat. 3,485,806.

An alternate way for producing suitable amine acrylimides consists of an in situ method whereby the vinyl ester, trimethyl hydrazinium salt and a strong base such as sodium methoxide, are reacted in a polar solvent all as described in U.S. Pat. 3,706,800.

The next step in obtaining the poly-N,N-ethylene ureas contemplated herein consists of copolymerizing the amine acrylimide with an active-hydrogen free comonomer containing a polymerizable $CH_2=C<$ group. The applicable comonomers accordingly embrace a variety of vinyl and vinylidene compounds.

An exemplary enumeration of suitable vinyl and vinylidene compounds for copolymerizing with the amine acrylimide include: the vinyl halides, e.g., vinyl chloride, vinyl fluoride, vinyl bromide, vinylidene chloride, etc.; including the vinyl pseudo halides, e.g., acrylonitrile and methacrylonitrile; the unsymmetrical dialkyl substituted ethylenes, e.g., isobutylene, isooctene, isooctadecene, the alpha olefins, e.g., 1-butene, 1-hexene, 1-octene, 1-dodecene, 1-hexadecene, 1-octadecene; the vinyl ethers, e.g., methyl-, ethyl-, propyl-, butyl-, isobutyl-, lauryl-, and stearyl vinyl ether; the vinyl esters, e.g., vinyl acetate, vinyl propionate, vinyl butyrate, vinyl laurate, vinyl stearate, etc.; the aromatic vinyl compounds, e.g., styrene, alpha methyl styrene, chloro-styrene, vinyl toluene and vinyl naphthalene; the vinyl derivatives of heterocyclic compounds, e.g., vinyl pyridine, N-vinyl pyrrolidine, N-substituted N-vinyl piperidine and the N-vinyl oxazolidones; acrylamide and the N-substituted acrylamides; the acrylates, halo- and methacrylates, e.g., ethyl acrylate, butyl chloro acrylate, hexyl acrylate, decyl acrylate, stearyl acrylate, behenyl acrylate, methyl methacrylate, octyl methacrylate, lauryl methacrylate eicosyl methacrylate; the vinyl ketones, e.g., methyl vinyl ketone, hexyl vinyl ketone, lauryl vinyl ketone, etc.; esters of alpha, beta-ethylenically unsaturated polycarboxylic acids, e.g., dimethyl maleate, dibutyl fumarate, dimethyl itaconate, etc.; esters of ethylenically unsaturated fatty acids, dimers and trimers thereof, e.g., oleic acid, linoleic acid, etc.; vinyl silanes, vinyl trifluoroacetate, 2,2,2, trifluoroethyl acrylate, etc. The various comonomers can be used singly or in combination with one another.

The copolymerization of the amine acrylimide with the vinyl or vinylidene comonomer can be carried out in bulk, in solution, or in an aqueous medium. Solution polymerization is preferred. A variety of organic solvents can be utilized for this purpose. Both aliphatic and aromatic solvents as well as mixtures thereof with a polar solvent are applicable. Aromatic solvents such as benzene, toluene, xylene, etc., and combinations thereof with a polar solvent; e.g., a lower alkanol, are preferred. Because of the relative stability of the aminimide grouping, elevated temperatures of as high as 100° C. can be used in carrying out copolymerization.

Copolymerization can be effected by heating alone, but is preferably initiated by the use of a conventional radical forming catalyst. In some instances, it is desirable to use the free radical forming catalyst in combination with a reducing agent or promoter. Such techniques are well understood in the polymerization art. The ratio of amine acrylimide to the comonomer or comonomers copolymerizable therewith can vary extensively depending in the main upon the particular use application envisioned for the final poly-N,N'-ethylene urea product.

Upon obtaining the polyaminimide as outlined above, the pendant aminimide groups thereof are thermally rearranged to isocyanate groups. Thermolysis of the polyaminimide can be effected by heating an organic solution thereof at a temperature of between about 120° and 200° C. and more preferably from about 120° and 150° C. In the rearrangement of the aminimide group to an isocyanate group, a tertiary amine is evolved. Accordingly, facilitating the removal of the tertiary amine is desirable. This can be accomplished by co-distilling a fraction of the evolved amine with the solvent employed in preparing the polyaminimide in accordance with the preferred method. Substantial conversion of the pendant aminimide groups to isocyanate groups can be readily achieved in this manner. Complete conversion, however, is not feasible and for that matter not preferred since the retention of aminimide groups along the polymer backbone is desirable. Also, when the leaving amine group in the thermolysis reaction contains a hydroxy alkyl substituent some pendant urethane groups will be generated. For example, when the leaving group is dimethyl 2-hydroxy propyl amine, the generated urethane group would have the following structure.

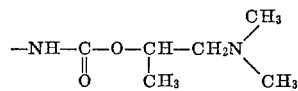

This occurrence is likewise beneficial for the reasons noted.

The final step is preparing the poly-N,N-ethylene ureas of this invention consists of reacting the thermolyzed aminimide, i.e., the resultant aliphatic polyisocyanate, with an ethylenimine of the formula:

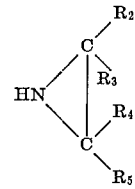

wherein $R_2$, $R_3$, $R_4$ and $R_5$ are either hydrogen, aryl or alkyl. An enumeration of representative ethylenimines for reaction with the polyisocyanate is as follows: ethylenimine, 2-methyl-ethylenimine, 2-ethyl-ethylenimine, 2,2-dimethyl-ethylenimine, 2,3-dimethyl-ethylenimine, 2,2,3-trimethylethylenimine, 2,2 - dimethyl-3-propyl-ethylenimine, 2-butyl-ethylenimine, 2,3-dipropyl-ethylenimine, 2-phenyl-ethylenimine, 2,3-diphenyl-ethylenimine, 2-ethyl-2-phenyl-ethylenimine, 2-ethyl-2-phenyl-3-methyl-ethyleneimine, 2-propyl-2-phenyl-ethylenimine, 2-tolyl-ethylenimine, 2-xylyl-ethylenimine, etc. The preferred imines are ethylenimine and 2-methylethylenimine.

The polyisocyanate is preferably reacted with the selected ethylenimine in a stoichiometric ratio, i.e., one mole of the ethylenimine per equivalent of the isocyanate (NCO) content of the copolymer. Applicable temperature conditions range from about room temperature to 50° C. It is preferred to react the ethylenimine with the polyisocyanate in an organic solution of the latter. Suitable solvents for this purpose are those enumerated hereinabove in connection with the preferred manner for carrying out copolymerization.

Reaction of the ethylenimine with the polyisocyanate in the foregoing manner results, as indicated hereinbefore, in the conversion of the pendant isocyanate groups to N,N-ethylene ureido groups. The polyisocyanate from whence the corresponding poly-N,N-ethylene urea is obtained can be formulated so as to provide the desired N,N-ethylene ureido content by appropriately adjusting the ratio of amine acrylimide to the comonomer(s) in preparing the copolymer, all as described hereinabove.

The novel poly-N,N-ethylene ureas of the present invention can be converted to a thermoset state by employing a strong acid catalyst. The Lewis acids boron trifluoride and phosphorus pentafluoride are especially suitable for this purpose. Since the ring opening of the ethylene ureido groups and the subsequent rate of condensation thereof can result in an undesirable exotherm, it is preferred to effect better control of the resultant condensation reaction using as a catalyst the latent form of the aforementioned Lewis acids. Exemplary of such catalysts are the various complexes thereof commonly used in a variety of industrial catalytic operations.

The reaction of an N,N-ethylene ureido group with an active hydrogen containing compound is similar in nature to the reaction of the latter with an isocyanate. Accordingly, compounds containing a plurality of active hydrogen atoms are useful as crosslinking agents for the poly-N,N-ethylene ureas of this invention. These compounds, in general, have active hydrogen containing groups such as —OH, —NH$_2$, —COOH, —SH and the like. Examples of the foregoing compounds include the various polyols, polyfunctional phenols, polyamines, polycarboxylic acids, polythiols and the like. Polyfunctional compounds having different active hyrogen containing groups can also be used, e.g., hydroxycarboxylic acids, amino alcohols, amino acids, etc.

An enumeration of representative difunctional compounds include: ethylene glycol, diethylene glycol, triethylene glycol, tetramethylene glycol, hexamethylene glycol, decamethylene glycol, resorcinol, pyrocatechol, pyrogallol, decamethylene dithiol, thioresorcinol, ethylene dithiol, phthalic acid, adipic acid, succinic acid, pimelic acid, azelaic acid, sebacic acid, brassylic acid, maleic acid, fumaric acid, glutaric acid, glutaconic acid, 1,4-cyclohexane dicarboxylic acid, 1,4-cyclohexene dicarboxylic acid, hexamethylene diamine, trimethylene diamine, 1,3-diaminobutane, tetramethylene diamine, phenylene diamine, toluene diamine, ethanolamine, triethanolamine, piperazine, bis-(hydroxymethyl) durene, 2,4-dinitrophenyl hydrazine, phenyl hydrazine and the like.

Particularly preferred crosslinking agents for use in accordance with this invention include polymers having a plurality of groups containing an active hydrogen obtained by either addition polymerization or esterification. Suitable polymers of the foregoing type can be obtained by esterifying a dicarboxylic acid with a stoichiometric deficiency of a diol to result in a condensation product having free carboxylic acid groupings. Likewise, the diol can be esterified with a stoichiometric deficiency of a dicarboxylic acid to provide a polymer having free hydroxyl groups. Suitable crosslinking agents further include those addition polymers derived by the polymerization of a comonomer containing a carboxyl, hydroxyl or amino group with a polymerizable compound devoid of an active hydrogen containing group. Applicable comonomers for imparting such functionality to the addition polymer include such as allyl alcohol, acrylic acid, methacrylic acid and the like. The amount of crosslinking agent used in relation to the poly-N,N-ethylene urea can be varied over an extensive range depending on such factors as the content of the N,N-ethylene ureido groups of the poly-N,N-ethylene urea, the degree of functionality exhibited by the particular crosslinking agent employed and the specific properties sought for the crosslinked or thermoset product.

The following working examples illustrate the best mode contemplated for carrying out the present invention. As indicated, these examples are given primarily by way of illustration and accordingly, any enumeration of detail set forth therein is not to be construed as limiting the invention except as such limitations appear in the appended claims. All parts are parts by weight unless otherwise noted.

EXAMPLE I

This example illustrates the preparation of three exemplary polymers of this invention, each being an addition polymer having a plurality of pendant N,N-ethylene ureido groups.

Polymer A

Into a suitable reaction vessel equipped with a stirrer were charged a monomeric mixture consisting of 25 parts n-butyl acrylate, 25 parts n-butyl methacrylate, 25 parts methyl methacrylate and 25 parts 1,1-dimethyl-1,1(2-hydroxypropyl) amine methacrylimide. A solvent mixture was then charged consisting of 360 parts xylene, 180 parts isopropanol and 60 parts methylethyl ketone.

With stirring, the polymerization mixture was heated to 80° C. and one part azobisisobutyronitrile was added. Heating was continued at 80° C. for 12 hours.

Following the indicated polymerization holding period, the reaction vessel was fitted with a reflux condenser and receiver and the addition polymer thermolyzed. Thermolysis was carried out at the reflux temperature of the system after removal of alcohol and ketone thereby resulting in the co-distillation of xylene and amine liberated in the course of the thermolysis reaction. The solids content of the reaction vessel was maintained substantially constant by the continuous addition of make-up xylene. Thermolysis conditions were maintained for two hours resulting in a polyisocyanate having a determined isocyanate (NCO) content of 2.8%. The non-volatile content was 33%.

To 100 parts of the polyisocyanate solution were added 1.6 parts of ethylene imine and the mixture stirred for one hour. Infrared analysis showed complete disappearance of the NCO absorption band and an appearance of the urea carbonyl absorption band.

Polymer B

The monomers and relative amounts thereof employed to prepare this polymer were as follows:

| | Parts |
|---|---|
| (1) Methyl methacrylate | 120 |
| (2) n-Butyl methacrylate | 160 |
| (3) 1,1-dimethyl-1-(2-hydroxypropyl)-amino methacrylimide | 186 |
| (4) n-Butyl acrylate | 160 |
| (5) Styrene | 240 |

Into a reaction vessel such as used in preparing Polymer A were charged 1750 parts xylene, 310 parts isopropyl alcohol, all of monomer (3) and 20% of the mixture of monomers (1), (2), (4) and (5). Eight parts of azobisisobutyronitrile were added and with stirring the polymerization mixture was heated to 75° C. Thereupon, the balance of the mixture of monomers (1), (2), (4) and (5) was added slowly over a two hour period. Polymerization was continued at 75° C. for 22 hours.

The above polymer was thermolyzed at 140° C. in the same manner as accomplished in thermolyzing Polymer A. Thermolysis in this instance, however, was carried out for a period of four hours. The thermolyzed product exhibited a NCO content of 2.34 and the non-volatile content of 30%.

To 100 parts of the 30% solution of polyisocyanate were added 1.3 parts of ethylene imine and the reaction solution stirred for one hour at ambient temperature.

Polymer C

The monomers and relative amounts thereof employed to prepare this polymer were as follows:

| | Parts |
|---|---|
| (1) Trimethyl methacrylimide | 142 |
| (2) Methyl methacrylate | 120 |
| (3) n-Butyl methacrylate | 160 |
| (4) n-Butyl acrylate | 160 |
| (5) Styrene | 240 |

Into a reaction vessel equipped with a stirrer were charged the monomer (1), 50% of the monomer (4) and 10% of a mixture of monomers (2), (3) and (5).

To this charge were added 1750 parts of xylene and 470 parts of isopropanol. Seven parts of azobisisobutyronitrile were added and a polymerization mixture brought to a temperature of 80° C. with stirring. After one hour holding the balance of the mixture of monomers (2), (3) and (5), were slowly added over a period of six hours. During this period, the balance of monomer (4) was separately added. Following completion of the monomer addition, the temperature was maintained at 80–85° C, for 12 hours. An additional one part of azobisisobutyronitrile was added and heating continued for an additional four hours at 80–85° C.

The reaction vessel was then equipped with a reflux condenser and receiver and the polymer solution brought up to a temperature of 140° in the course of which all of the isopropyl alcohol was removed and make-up xylene supplied to compensate for such removal. Heating was continued for three hours resulting in co-distillation of xylene and the amine liberated in the course of the thermolysis reaction. The solids content of the reaction vessel was maintained constant by the continuous addition of make-up xylene. The completed polymer exhibited an isocyanate content of 1.16% by weight and the resultant solution contained 30.9% solids.

To 100 parts of the polyisocyanate solution was added 0.7 part of ethylene imine and the reaction solution stirred for one hour at ambient temperature.

EXAMPLE II

This example illustrates the use of various types of crosslinking agents for co-reacting with the poly-N,N-ethylene ureas of Example I to provide thermoset compositions in the form of a surface coating film. In each test about equal weight amounts on a solid basis of the poly-N,N-ethylene urea and the indicated crosslinking agents were combined and thoroughly mixed. The resultant resinous compositions were cast on glass and baked at 260° F. for 20 minutes. Results of an evaluation testing of the baked films are set forth in the following Table I.

TABLE 1

| Polymer | Crosslink agent | Sward | Tukon | Hot track | Solvent (Xylol) resistance* | Adhesion | Mar resistance |
|---|---|---|---|---|---|---|---|
| A | Poly-OH | 82 | 11.5 | No tack | 2 | Excellent | Good+. |
| A | Poly-NH$_2$ | 64 | 6.97 | ...do | 2 | ...do | Good. |
| A | Poly-COOH | 66 | 9.14 | ...do | 2 | Good | Do. |
| B | Poly-OH | 85 | 13.0 | ...do | 1 | Excellent | Good+. |
| B | Poly-NH$_2$ | 67 | 7.31 | ...do | 2 | ...do | Good. |
| B | Poly-COOH | 69 | 10.0 | ...do | 1 | Good | Do. |
| C | Poly-OH | 65 | 8.0 | Slt. tack | 3 | Good– | Good–. |
| C | Poly-NH$_2$ | 52 | 6.1 | ...do | 3 | Fair+ | Fair+. |

*Arbitrary numerical scale with 0 = best and 5 = poor.

NOTE.—Poly-OH = RJ-100 (Shell Chem.)—Styrene/allyl alcohol copolymer; poly-NH$_2$ = Amine A100 (Gen. Mills)—Polyamide amine; Poly-COOH = Acrylate/acrylic acid copolymer containing about 10% acrylic acid.

We claim:

1. A poly-N,N-ethylene urea prepared by reacting the pendant isocyanate groups of an aliphatic polyisocyanate with an ethyleneimine of the formula

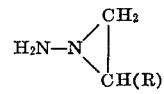

wherein R is H or CH$_3$; said polyisocyanate being the thermolyzed addition polymerization product of 1,1-dimethyl-1-(2-hydroxypropyl) amine methacrylimide and a comonomer selected from the group consisting of a C$_1$–C$_{22}$ alkyl acrylate, a C$_1$–C$_{22}$ alkyl methacrylate, a styrene, vinyl acetate and mixtures thereof.

2. A substantially insoluble and infusible resinous composition which is the reaction product of the poly-N,N-ethylene urea of Claim 1 further reacted with a cross-linking agent having at least two reactive hydrogen atoms.

3. A substantially insoluble and infusible resinous composition in accordance with Claim 2 wherein said cross-linking agent is a polyamine.

4. A substantially insoluble and infusible resinous composition in accordance with Claim 2 wherein said cross-linking agent is a polycarboxylic acid.

5. A substantially insoluble and infusible resinous composition in accordance with Claim 2 wherein said cross-linking agent is a polyol.

References Cited

UNITED STATES PATENTS 3,527,802  9/1970  Slagel _____ 260—87.5 R X
2,326,287  8/1943  Coffman _____ 260—80 NC X

FOREIGN PATENTS 721,363  11/1965  Canada _____ 260—77.5 CH

HERBERT S. COCKFRAM, Primary Examiner

U.S. Cl. X.R.

260—2 EN, 77.5 AT, 80 NC

UNITED STATES PATENT OFFICE
CERTIFICATE OF CORRECTION

Patent No. 3,829,407       Dated August 13, 1974

Inventor(s) William J. McKillip et al.

It is certified that error appears in the above-identified patent and that said Letters Patent are hereby corrected as shown below:

The formula in Claim 1 should read

-- 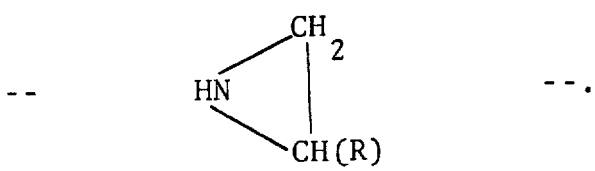 --.

Signed and sealed this 12th day of November 1974.

(SEAL)
Attest:

McCOY M. GIBSON JR.
Attesting Officer

C. MARSHALL DANN
Commissioner of Patents